United States Patent
Esmail et al.

(10) Patent No.: US 11,479,189 B2
(45) Date of Patent: Oct. 25, 2022

(54) HIGH-SPEED-WIRING-SYSTEM ARCHITECTURE

(71) Applicant: Tesla, Inc., Palo Alto, CA (US)

(72) Inventors: Adnan Esmail, Palo Alto, CA (US); In Jae Chung, San Jose, CA (US); Lakshya Jain, Mountain View, CA (US); Brijesh Tripathi, Los Altos, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/271,302

(22) Filed: Feb. 8, 2019

(65) Prior Publication Data

US 2019/0248310 A1 Aug. 15, 2019

Related U.S. Application Data

(60) Provisional application No. 62/629,560, filed on Feb. 12, 2018.

(51) Int. Cl.
| | |
|---|---|
| *H04L 12/437* | (2006.01) |
| *B60R 16/023* | (2006.01) |
| *H04L 12/42* | (2006.01) |
| H04L 45/00 | (2022.01) |
| H04L 12/40 | (2006.01) |

(52) U.S. Cl.
CPC ......... *B60R 16/0231* (2013.01); *H04L 12/42* (2013.01); *H04L 12/437* (2013.01); *H04L 45/22* (2013.01); *H04L 2012/40273* (2013.01)

(58) Field of Classification Search
CPC ....... H04L 12/42; H04L 12/437; H04L 45/22; H04L 2012/40273; B60R 16/0231

USPC .......................................................... 370/254
See application file for complete search history.

(56) References Cited

U.S. PATENT DOCUMENTS

| | | | | |
|---|---|---|---|---|
| 4,710,915 | A | * 12/1987 | Kitahara | ............... H04L 12/437 370/224 |
| 5,097,099 | A | 3/1992 | Miller | |
| 5,342,991 | A | 8/1994 | Xu | |
| 5,428,187 | A | 6/1995 | Crane | |
| 5,461,370 | A | * 10/1995 | Igarashi | ............... G08B 26/005 340/2.7 |
| 6,095,836 | A | * 8/2000 | Bolen | ................ B65H 75/4452 439/164 |
| 6,126,458 | A | 10/2000 | Gregory, II | |
| 6,528,731 | B2 | 3/2003 | Murakami | |
| 6,630,624 | B2 | 10/2003 | Tsao | |
| 6,740,808 | B1 | 5/2004 | Chang | |
| 6,746,255 | B1 | 6/2004 | Lee | |
| 6,803,518 | B2 | 10/2004 | Chang | |

(Continued)

FOREIGN PATENT DOCUMENTS

| | | |
|---|---|---|
| CN | 103545633 | 1/2014 |
| EP | 0 305 058 | 3/1989 |

(Continued)

*Primary Examiner* — Gbemileke J Onamuti
(74) *Attorney, Agent, or Firm* — Knobbe Martens Olson & Bear LLP

(57) ABSTRACT

A wiring system for an automobile connecting a processor and a plurality of devices, using one or more backbone sections. The processor and devices are connected to one another to form a first loop and a second loop, such that data may be transmitted along the first loop and data may be transmitted along the second loop.

19 Claims, 6 Drawing Sheets

(56) References Cited

U.S. PATENT DOCUMENTS

| | | |
|---|---|---|
| 7,004,767 B2 | 2/2006 | Kim |
| 7,086,888 B2 | 8/2006 | Wu |
| 7,261,585 B2 | 8/2007 | Yamanashi |
| 9,172,149 B2 | 10/2015 | Xing |
| 9,508,467 B2 | 11/2016 | Pon |
| 9,697,926 B2 | 7/2017 | Huang |
| 9,966,165 B2 | 5/2018 | Gross |
| 10,096,952 B1 | 10/2018 | Silver |
| 10,110,999 B1* | 10/2018 | Lim .................. G06F 3/012 |
| 10,147,515 B2 | 12/2018 | Chin |
| 10,586,632 B2 | 3/2020 | Esmail et al. |
| 10,988,092 B2 | 4/2021 | Takamatsu |
| 2002/0046870 A1 | 4/2002 | Zein |
| 2003/0121694 A1 | 7/2003 | Grogl |
| 2004/0008721 A1* | 1/2004 | Ying ..................... H04L 12/437 370/460 |
| 2008/0250632 A1 | 10/2008 | Dayton |
| 2009/0051554 A1* | 2/2009 | Jarvie ................ G01M 3/2892 340/622 |
| 2010/0149999 A1* | 6/2010 | Beattie, Jr. .............. H04M 1/24 370/249 |
| 2011/0232938 A1 | 9/2011 | Kodama |
| 2012/0049789 A1 | 3/2012 | Medina |
| 2012/0111602 A1 | 5/2012 | Wei |
| 2014/0187080 A1 | 7/2014 | Holland |
| 2015/0022376 A1* | 1/2015 | Zhang ................. G01F 23/0061 340/870.37 |
| 2016/0351302 A1 | 12/2016 | Gundel |
| 2017/0069991 A1 | 3/2017 | Hombo |
| 2017/0080929 A1* | 3/2017 | Sawamoto ........ B60W 30/0956 |
| 2017/0207549 A1 | 7/2017 | Chang |
| 2018/0026381 A1 | 1/2018 | Haraguchi |
| 2018/0174716 A1 | 6/2018 | Kominato |
| 2018/0301247 A1 | 10/2018 | Kobayashi |
| 2019/0043641 A1* | 2/2019 | Chen .................... H01B 11/00 |
| 2019/0174641 A1 | 6/2019 | Kato |
| 2019/0214164 A1 | 7/2019 | Chung et al. |
| 2019/0217794 A1 | 7/2019 | Chandra et al. |

FOREIGN PATENT DOCUMENTS

| | | |
|---|---|---|
| JP | 2007-109485 | 4/2007 |
| JP | 2007-324065 | 12/2007 |
| JP | 4976055 | 7/2012 |

\* cited by examiner

HIGH-SPEED-WIRING-SYSTEM ARCHITECTURE

CROSS REFERENCE TO RELATED PATENTS

The present U.S. Utility Patent Application claims priority pursuant to 35 U.S.C. § 119(e) to U.S. Provisional Application No. 62/629,560, entitled "HIGH-SPEED-WIRING-SYSTEM ARCHITECTURE", filed Feb. 12, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

The present disclosure relates to a wiring-system architecture. More particularly, the present disclosure relates to a wiring-system architecture for transmitting data at a high rate and with redundancies.

Description of Related Art

Traditional wiring systems typically connect devices to a central point, such as a processor, using a cable to connect each device to the processor. The processor communicates with each device individually. Typically, the cables transmit data from a device to the processor or from the processor to the device. That is, each cable can only transmit data in a single direction during operation. If one of the cables fails, then the communication to and from the device fails. That is, there is no redundancy. Such loss of communication negatively impacts the overall functioning of the system. When the data transmitted relates to driver-assist and autonomous-driving functionality, such decrease of system functionality may result in complete system failure and a compromised situation.

To prevent loss of communication from a single cable failure, cables may be paired to create redundancy. Such repeating may be tedious and also require two attachment points, which requires a larger physical space at the attachment point. When a processor is connected to multiple devices, the processor (or printed circuit board holding the processor) must have enough connection points, which may require a large physical space, and an increased cost to manufacture such a large board. Hence, there is a need for a wiring system that overcomes the aforementioned drawbacks.

Figure 1:
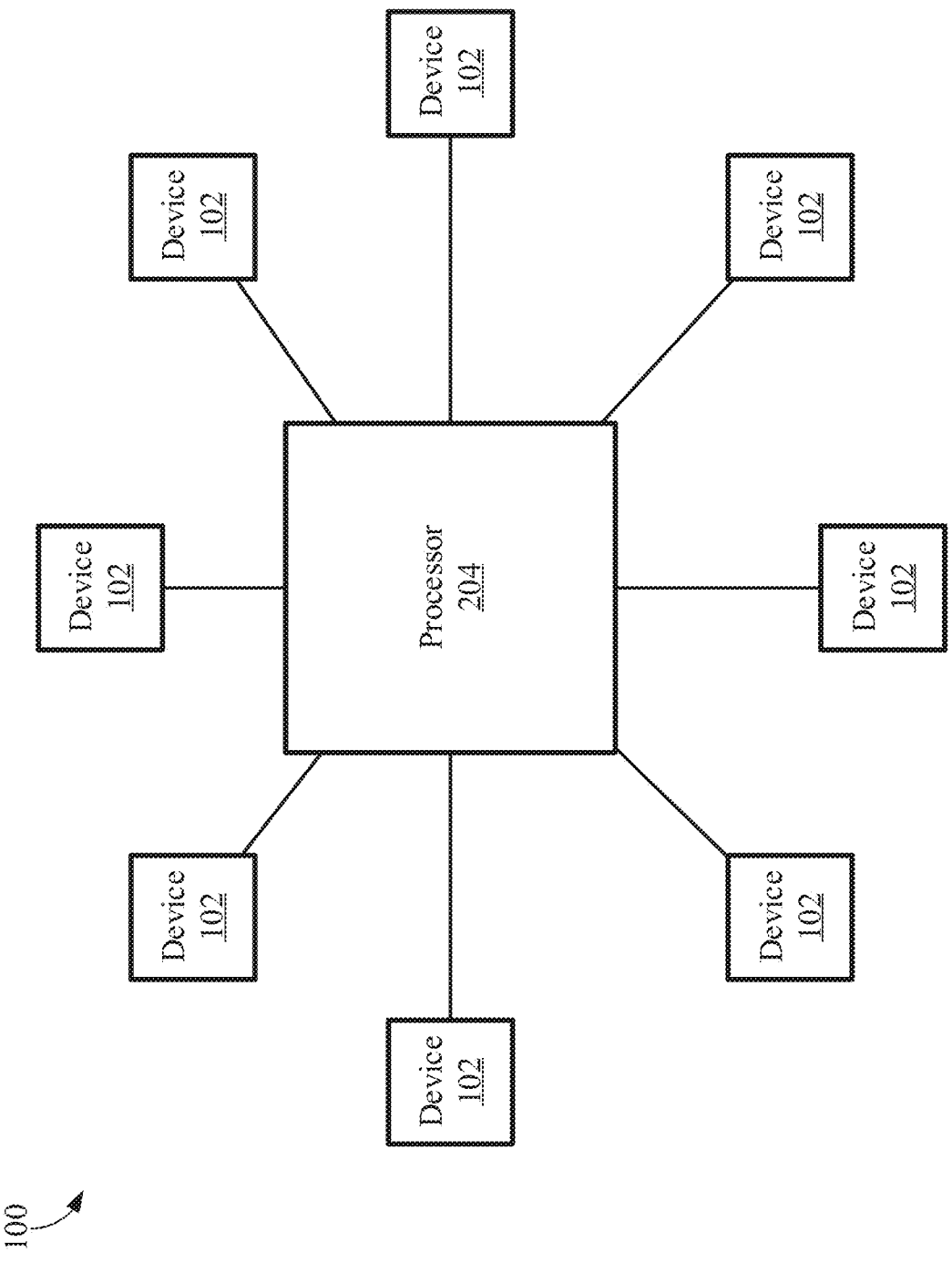
FIG. 1 is a schematic illustration of a wiring system for an automobile showing a plurality of devices connected in a star configuration, according to a known wiring system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure relates to a wiring-system architecture. More particularly, the present disclosure relates to a wiring system architecture for transmitting data at a high rate and with redundancies. The backbone has two or more communication pathways. Further, the communication pathways may form loops (i.e., starting and ending at the same device or location, such as a processor) to create redundant communication pathways. That is, if one communication pathway fails, data may be transmitted via the other pathway. The loss of one communication pathway will not result in communication loss. Rather, data may still transmit along the other communication pathway. In embodiments, the pathways transmit data in opposite directions.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a schematic illustration of a wiring system 100 for an automobile showing a plurality of devices 102 connected to a processor 104 in a star configuration, according to a known wiring-system configuration. As shown in FIG. 1, each of the devices 102 communicates with the processor 104 along a dedicated cable. However, failure of a connection between any of the devices 102 with the central processor 104 can lead to a loss in the overall performance of the system 100.

Figure 2A:
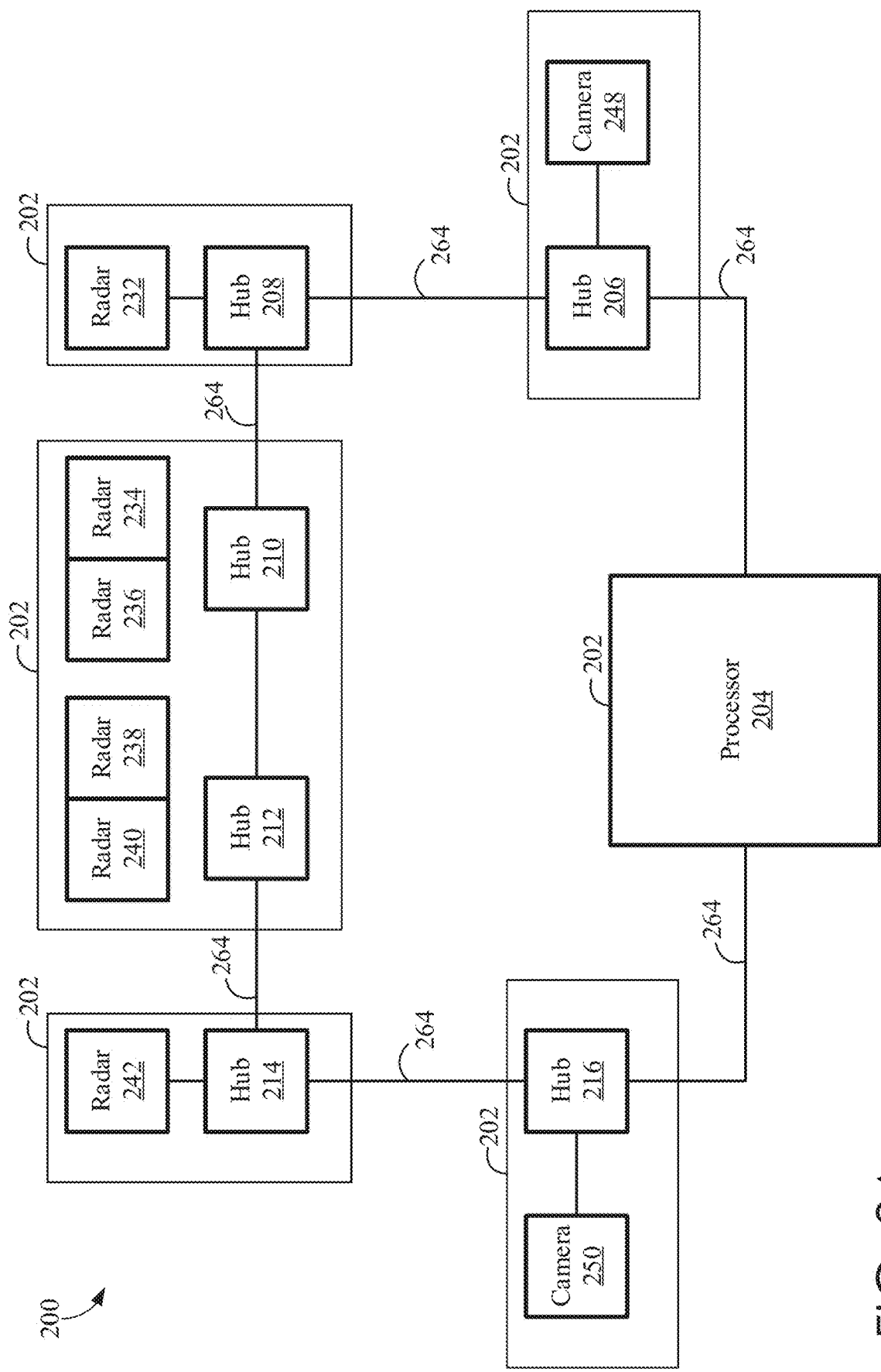
FIG. 2A is a schematic illustration of a wiring-system architecture for an automobile showing a plurality of devices connected in a loop by a backbone according to certain embodiments of the current disclosure.
Figure 2B:
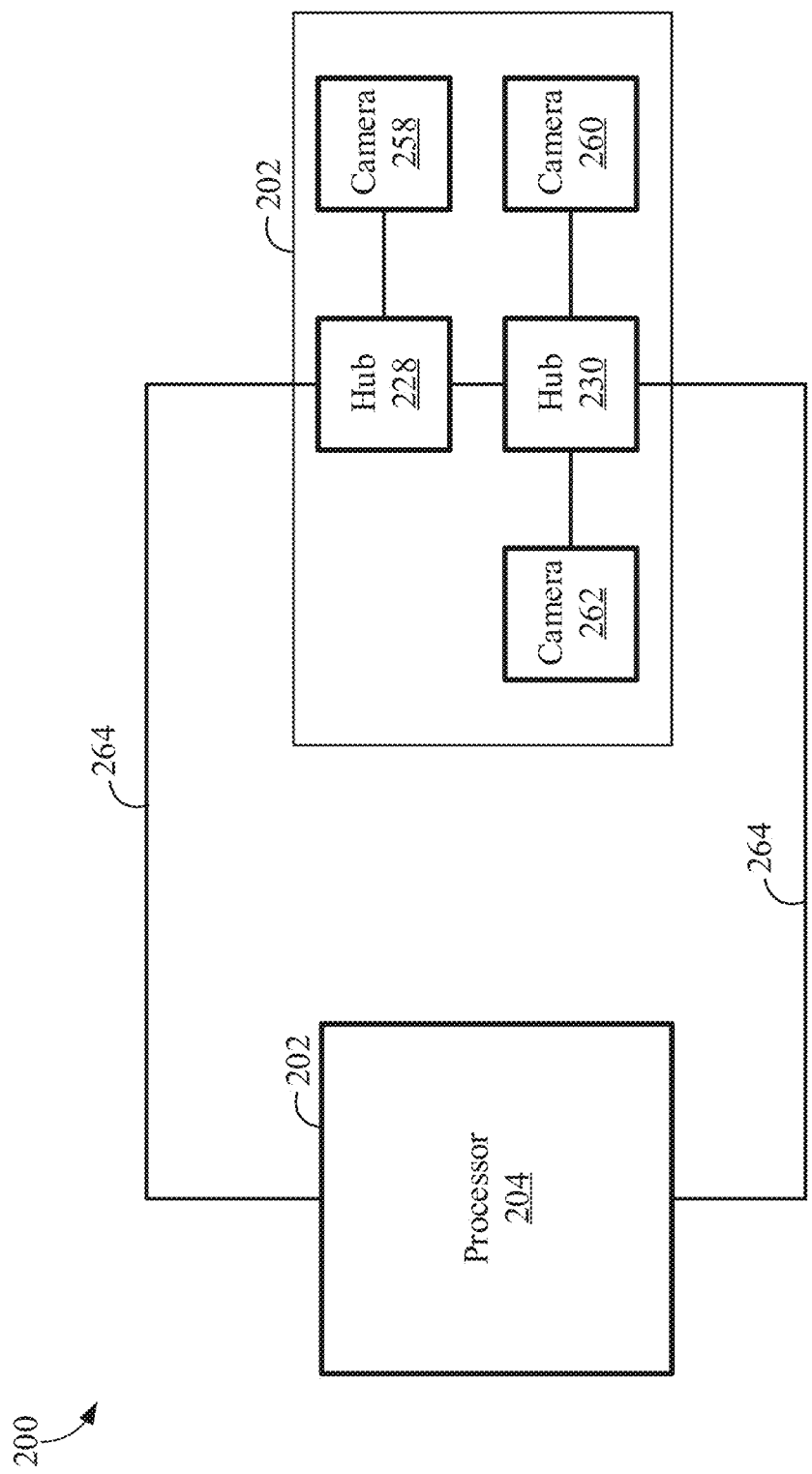
FIG. 2B is a schematic illustration of a wiring-system architecture for an automobile showing a plurality of devices connected in a loop by a backbone according to certain embodiments of the current disclosure.
Figure 2C:
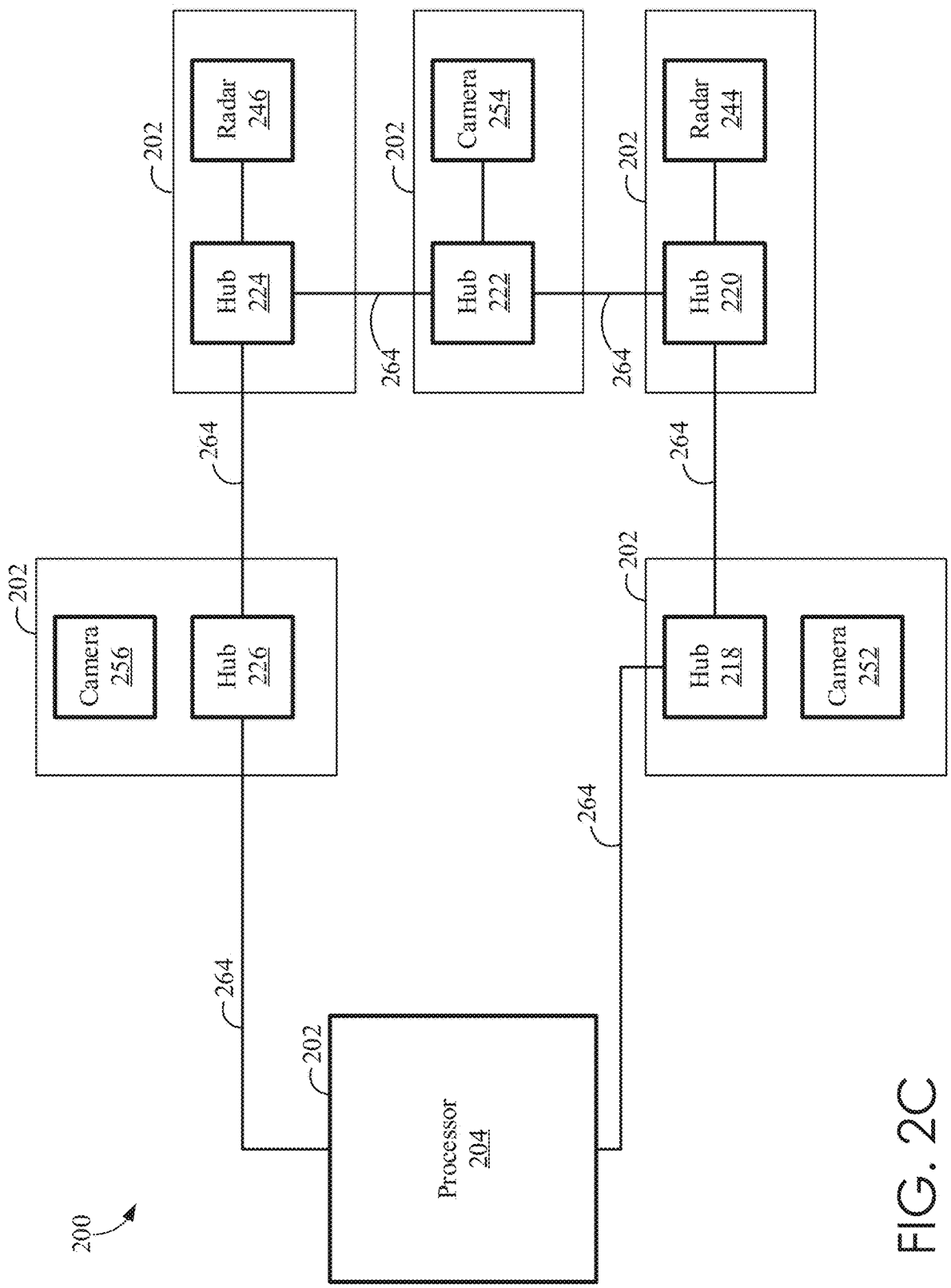
FIG. 2C is a schematic illustration of a wiring-system architecture for an automobile showing a plurality of devices connected in a loop by a backbone according to certain embodiments of the current disclosure.

FIGS. 2A-2C are exemplary schematic illustrations of a wiring-system architecture 200 according to a certain embodiment of the present invention. In embodiments herein, the wiring-system architecture is for an automobile. The automobile may be any vehicle, for example, a passenger car, a semi truck, a sport utility vehicle, can, passenger trucks, or other vehicle. Although the wiring-system architecture 200 will be explained in reference to connecting devices that may be present in an automobile, use in an automobile is merely one of the many possible areas for the wiring-system architecture 200 of the present disclosure. The use of the wiring-system architecture 200 may extend to connecting other types of electrically-powered devices that form parts of larger systems including, but not limited to, connecting devices within nautical applications, connecting devices within farm equipment, and other industrial and consumer-product applications.

As shown in FIGS. 2A-2C, the wiring-system architecture 200 of the automobile includes multiple devices 202. and a processor 204. Each device has a hub (206-230). Backbone 264 connects devices 202 and allows for bi-directional communication in either direction (clockwise or counter-clockwise) around the loop. In embodiments, one or more of the hubs, for example, hubs 208-214, 220, and 224 are associated with radars 232-242, 244, and 246 respectively. In embodiments, one or more of the hubs, for example, hubs 206, 216, 218, 222, 226 and 228-230 are associated with cameras 248, 250, 252, 254, 256, and 258-260 respectively. Moreover, each of the hubs 206-230 includes a controller therein for controlling corresponding ones of the connected devices 202, for example, cameras 248, 250, 252, 254, 256, and 258-260 or radars 232-242, 244, and 246 respectively.

The cameras 248-260 and radars 232-246 may be located at different positions within the automobile and intended to provide data according to different orientations. In embodiments, the cameras 248-260 and radars 232-246 provide redundant data. The cameras 248-260 and radars 232-246 may generate visual data, sonic data, thermal data, or other data, and then transmit the data to the processor 204 via the device's corresponding hub. A hub may be associated with any number of cameras or radars. For example, a single hub 206 may control a single camera 248. or a single hub 208 may control a single radar 232. In another embodiment, a single hub 210 may control a pair of radars 234 and 236, or a pair of cameras 260 and 262.

The backbone 264 connects the devices 202. In embodiments, a hub from each device 202 is serially connected to a hub from an adjacent device 202 using the backbone 264. In other embodiments, each hub is connected to backbone 264 in a "parallel" configuration such that if any hub fails, data may still be communicated through the backbone 264. In the serial embodiment, multiple hubs within each device 202, for example, hubs 210 and 212 are serially connected to each other using the backbone 264. In the parallel embodiment, multiple hubs within each device 202, for example, hubs are each connected to the backbone 264 such that if one or more of the hubs fail, data from the other hubs and devices may still transmit data around backbone 264 in both directions.

In embodiments, when backbone is formed using a bi-directional cable, such as the one disclosed in U.S. Provisional Application No. 62/614,110, then the wiring-system architecture can tolerate one fault in the backbone while still maintaining communication pathways for all hubs and devices. The entire disclosure of U.S. Prov. Pat. Appl. No. 62/614,110 is incorporated herein by reference. For example, if a fault occurs (such as backbone severing between hub 214 and hub 212, then hubs 216 and 214 may still receive information from processor 204 though the portions of backbone 264 that are not have not experienced the fault, specifically backbone sections 264 that connect processor 204 to hub 216 and then hub 216 to hub 214 (that is the backbone portions clockwise from processor 204). Data may be sent from the corresponding hubs and devices in the opposite direction. Similarly, if a fault occurs (such as backbone severing between hub 214 and hub 212, then hubs 212, 210, 208, and 206 may still receive information from processor 204 though the portions of backbone 264 that are not have not experienced the fault, specifically backbone sections 264 that connect processor 204 to hub 206, hub 206 to hub 208, hub 208 to hub 210, and hub 210 to hub 212 (that is the backbone portions counterclockwise from processor 204). Data may be sent from the corresponding hubs and devices in the opposite direction.

Figure 3:
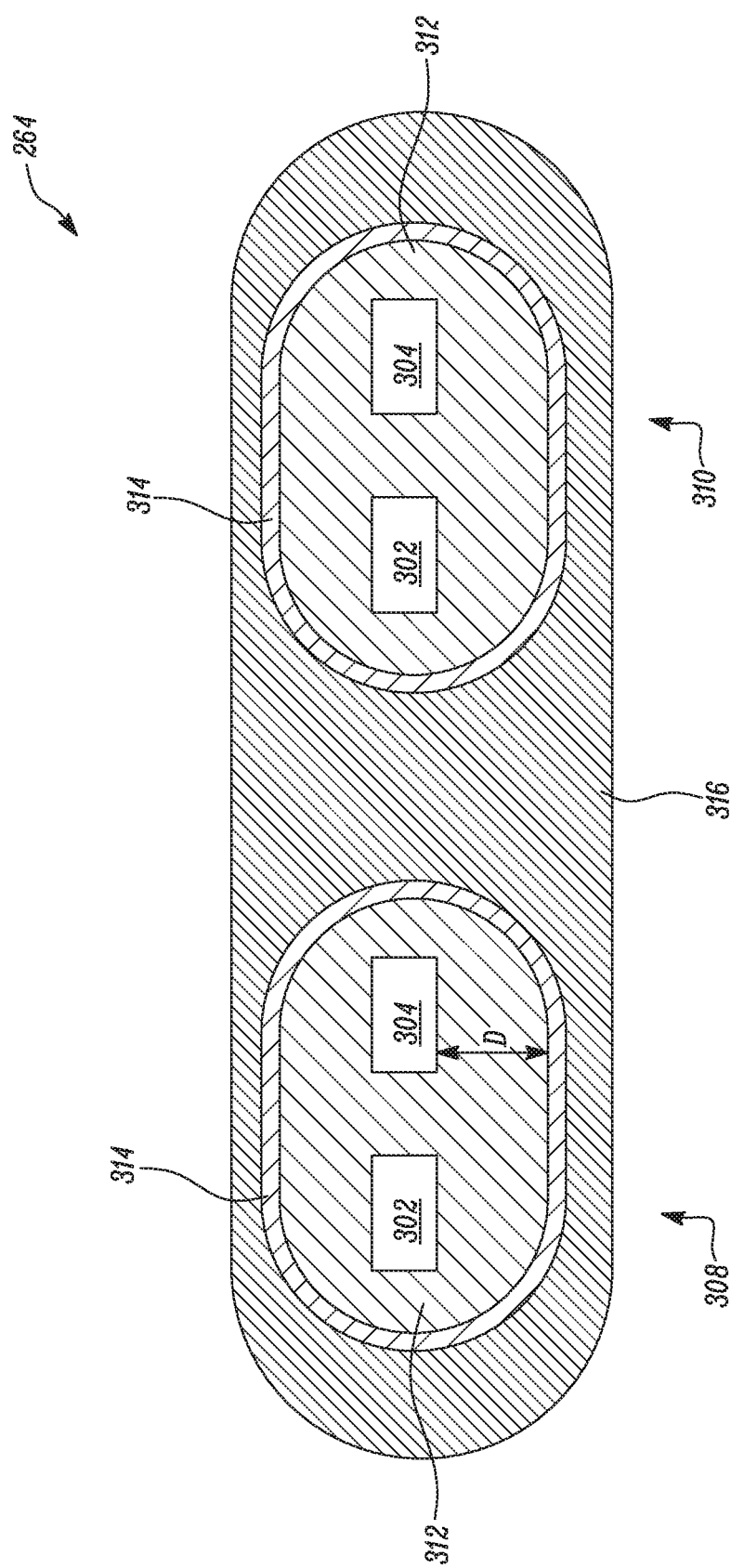
FIG. 3 illustrates a cross-sectional view of the backbone according to certain embodiments of the current disclosure.

FIG. 3 shows a cross-section of the backbone 264. As shown, the backbone 264 includes at least a pair of elongated conductors 302, 304 that are located alongside one and spaced apart and insulated from one another. As shown in FIG. 3, the backbone 264 includes two pairs of elongated conductors that are denoted by corresponding ones of numerals 308, 310 respectively. Although two pairs 308, 310 are shown, the backbone 264 may include more than two pairs to create redundancy in the communication pathways for power and data depending on specific requirements of an application.

As shown, the backbone 264 also includes an inner insulating matrix 312 that is between and around the pair of elongated conductors 302, 304. The backbone 264 further includes a conductive shield member 314 around the inner insulating matrix 312, and an outer insulating matrix 316 that is disposed around the conductive shield member 314. The inner and outer insulating matrices 312, 316 may be made from similar or dissimilar materials including polyethylene (PE), polypropylene (PP), polyethylene terephthalate (PET), but is not limited thereto. Various other suitable thermoplastic polymers commonly known to persons skilled in the art may be used, in lieu of the materials exemplarily disclosed herein, to form the outer and inner insulating matrices 312, 316.

When multiple pathways exist, backbone 264 may allow for the transmission of data and power in opposite directions. When backbone 264 is connected in a loop, as shown in FIG. 2A, 2B, or 2C, a first loop and a second loop are formed by the first pair of elongated conductors 308 and the second pair of elongated conductors 310 respectively. The first loop may be configured to transmit power and/or data to devices 202 in a first direction, and the second loop may be configured to transmit power and/or data between to devices 202 in a second direction. The first and second directions may be the same direction or they may be opposite directions.

Figure 4:
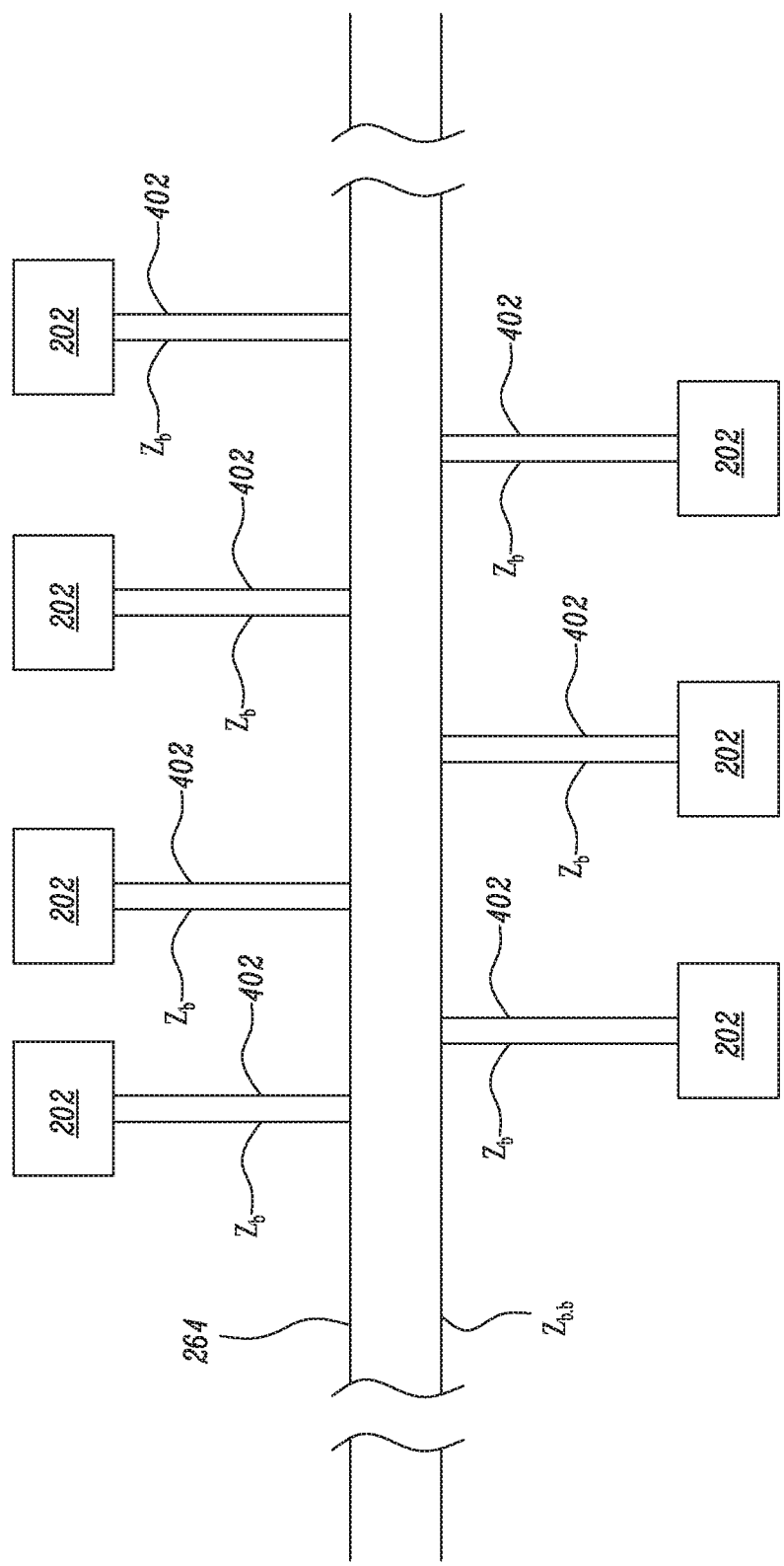
FIG. 4 illustrates how wiring-system architecture that can be used to connect devices in a "parallel" configuration according to certain embodiments of the current disclosure.

FIG. 4 illustrates an exemplary "parallel" configuration of the wiring-system architecture 200 used to connect multiple devices 202. As shown, the wiring-system architecture 200 includes multiple branches 402. Each branch 402 connects with the backbone 264 and a corresponding device 202 from the multiple devices 202. In other embodiments, the devices 202 may contain a hub, with the hub connected to one or more sensors, more similar to the "serial" configuration.

Further, in an embodiment, an amount of impedance $Z_b$ associated with the branch 402 is greater than or equal to an impedance $Z_{b.b}$ associated with the backbone 264 i.e., $Z_b \geq Z_{b.b}$. For instance, the amount of impedance $Z_b$ associated with the branch 402 may be twice that of the backbone 264 i.e., $Z_b = 2*Z_{b.b}$. In an embodiment, the amount of impedance $Z_b$ associated with the branch 402 is in the range of 75-125 Ohms. Further, in this embodiment, a length of the backbone 264 may be selected such that the impedance $Z_{b.b}$ of the backbone 264 is in the range of 40-60 Ohms.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. For example, reference is made to "conductor" or "conductors," but a person of ordinary skill in the art will understand that in certain embodiments, one or more wires (for example, metal having an insulation, an outer sheathing, and a conductive shield interspersed between the insulation and the outer sheathing) may be substituted. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed wiring system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all of which would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., coupled, connected, and the like) are only used to aid the reader's understanding of the present disclosure, and may not create limitations, particularly as to the position, orientation, or use of the elements disclosed herein. Therefore, joinder references, if any, are to be construed broadly. Moreover, such joinder references may not necessarily infer that two elements are directly connected to each other.

Additionally, all numerical terms, such as, but not limited to, "first", "second", "third", "primary", "secondary", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A wiring system for an automobile comprising:
 a processor housed within an automobile, wherein the processor is configured to process sensor data generated by sensing devices housed within the automobile;
 a plurality of sensing devices housed within the automobile, wherein individual sensing devices of the plurality of sensing devices comprise at least one sensing device configured to obtain data associated with the automobile; and
 one or more backbone sections housed within the automobile and configured for facilitating bi-directional communication of the plurality of sensing devices based on two pairs of elongated conductors passing through each of the one or more backbone sections;
 wherein the processor and each of the plurality of sensing devices are communicatively coupled to one another through the one or more backbone sections to form a first loop and a second loop, such that data may be transmitted along the first loop and data may be transmitted along the second loop.

2. The wiring system of claim 1, wherein the first loop transmits data in a first direction, and the second loop transmits data in a second direction, wherein the second direction is opposite to the first direction.

3. The wiring system of claim 2, wherein at least one of the plurality of sensing devices comprises a hub communicatively coupled to a radar sensor.

4. The wiring system of claim 3, wherein the hub includes a controller for controlling the radar sensor.

5. The wiring system of claim 2, wherein at least one of the plurality of devices comprises a hub communicatively coupled to a camera sensor.

6. The wiring system of claim 5, wherein the hub includes a controller for controlling the camera sensor.

7. The wiring system of claim 2 further comprising:
 a plurality of branches, wherein each branch from the plurality of branches connects with the backbone and at least one of the plurality of sensing devices.

8. The wiring system of claim 7, wherein an impedance each branch of the plurality of branches is greater than or equal to an impedance of the backbone.

9. The wiring system of claim 8, wherein the impedance of at least one branch of the plurality of branches is between 75-125 Ohms.

10. The wiring system of claim 7, wherein an impedance of each branch of the plurality of branches is at least twice an impedance of the backbone.

11. The wiring system of claim 1, wherein the two pairs of elongated conductors passing through the one or more backbone sections comprises a first conductor and a second conductor, wherein the second conductor is spaced apart from the first conductor.

12. The wiring system of claim 11, wherein the first loop is formed at least in part with the first conductor and the second loop is formed at least in part with second conductor.

13. The wiring system of claim 1, wherein the at least one sensing device is a radar sensor or a camera sensor.

14. A wiring system for an automobile comprising:
 a processor housed within an automobile, wherein the processor is configured to process data related to the automobile;
 a plurality of devices housed within the automobile, wherein each of the plurality of devices comprises a hub that is communicatively coupled to at least one sensing device configured to capture data associated with the automobile;
 one or more backbone sections housed within the automobile, wherein the one or more backbone sections comprises two or more pairs of elongated conductors passing through the one or more backbone sections corresponding to a first conductor and a second conductor spaced apart from the first conductor;

wherein the processor and the hub of each of the plurality of devices are communicatively coupled to one another through the one or more backbone sections to form a first loop and a second loop, such that data may be transmitted along the first loop and data may be transmitted along the second loop, wherein the first loop is formed at least in part with the first conductor and the second loop is formed at least in part with second conductor.

15. The wiring system of claim 14, wherein the first loop transmits data in a first direction, and the second loop transmits data in a second direction, wherein the second direction is opposite to the first direction.

16. The wiring system of claim 14, wherein one of the plurality of devices comprises a hub that is communicatively coupled to at least one sensing device, wherein the hub comprises a controller configured to control the at least one sensing device.

17. The wiring system of claim 16, wherein the at least one sensor device comprises at least one of a radar sensor or a camera sensor.

18. The wiring system of claim 14 further comprising:
   a plurality of branches, wherein each branch from the plurality of branches connects with the backbone and one of the plurality of devices.

19. The wiring system of claim 16, wherein the one or more backbone sections further comprises:
   a first insulating member positioned between and at least partially around the first conductor and the second conductor;
   a conductive member disposed at least partially the first insulting member; and
   a second insulating member disposed at least partially around the conductive member.

\* \* \* \* \*